US012712651B2

(12) United States Patent
Kaur et al.

(10) Patent No.: US 12,712,651 B2
(45) Date of Patent: Aug. 18, 2026

(54) DERIVED COVERAGE ZONES FOR CLOSED-LOOP UPLINK POWER CONTROL IN ADVANCED NETWORKS

(71) Applicant: Dell Products L.P., Round Rock, TX (US)

(72) Inventors: Manbir Kaur, Brampton (CA); Yasser AlEryani, Kanata (CA); Vikas Arora, Ottawa (CA); Sean Xiao, Toronto (CA); Ravi Sharma, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 407 days.

(21) Appl. No.: 18/413,282

(22) Filed: Jan. 16, 2024

(65) Prior Publication Data

US 2025/0233677 A1 Jul. 17, 2025

(51) Int. Cl.
*H04B 17/391* (2015.01)
*H04B 17/336* (2015.01)
*H04W 52/36* (2009.01)

(52) U.S. Cl.
CPC ....... *H04B 17/3913* (2015.01); *H04B 17/336* (2015.01); *H04W 52/365* (2013.01)

(58) Field of Classification Search
CPC .... H04B 17/30; H04B 17/309; H04B 17/391; H04B 17/3912; H04B 17/3913;
(Continued)

(56) References Cited

U.S. PATENT DOCUMENTS

2023/0239030 A1* 7/2023 Yao ...................... H04B 7/0617 375/262
2023/0254714 A1* 8/2023 Murayama ............ H04W 24/06 370/252

(Continued)

OTHER PUBLICATIONS

Dreifuerst et al., "Optimizing Coverage and Capacity in Cellular Networks using Machine Learning", May 13, 2021, ICASSP 2021-2021 IEEE International Conference on Acoustics, Speech and Signal Processing (ICASSP), DOI: 10.1109/ICASSP39728.2021.9414155, pp. 1-5 (Year: 2021).*

(Continued)

*Primary Examiner* — Paul H. Masur
(74) *Attorney, Agent, or Firm* — Amin, Turocy & Watson, LLP

(57) ABSTRACT

The technology described herein is directed towards dynamically determining, based on current environment state data, a number of coverage zones within a base station's coverage area, and physical uplink shared channel (PUSCH) closed-loop power control-related data for user equipment in each zone. In one implementation, a deep reinforcement learning (DRL)-based system includes a first DRL agent that, based on the current environment state, outputs the optimal number of zones. Based on the current environment state data and the number of zones, a second DRL agent outputs optimal per-zone target signal-to-interference-plus-noise ratio (SINR) values. The SINR values are used in outputting transmit power control data to the UEs in each coverage zone. Also described is deep reinforcement learning by the system based on a reward function that can balance enhanced power efficiency with enhanced throughput to determine the optimal number of zones and SINR values for various current environment state data.

20 Claims, 10 Drawing Sheets

(58) Field of Classification Search
CPC ..... H04W 52/04; H04W 52/30; H04W 52/36; H04W 52/365; H04W 16/24–32; H04W 52/06; H04W 52/08; H04W 52/18; H04W 52/22–248
See application file for complete search history.

(56) References Cited

U.S. PATENT DOCUMENTS

| | | | | |
|---|---|---|---|---|
| 2024/0155463 | A1* | 5/2024 | Cummings | H04W 16/24 |
| 2025/0126485 | A1* | 4/2025 | Koc | H04B 17/318 |
| 2025/0159499 | A1* | 5/2025 | Amorosa | H04W 84/02 |

OTHER PUBLICATIONS

"5G; NR; Physical layer procedures for control (3GPP TS 38.213 version 17.1.0 Release 17)" ETSI TS 138 213 V17.1.0, May 2022, 247 pages.

* cited by examiner

DERIVED COVERAGE ZONES FOR CLOSED-LOOP UPLINK POWER CONTROL IN ADVANCED NETWORKS

BACKGROUND

In fifth generation (5G) new radio, the transmit power of user equipment (UE) is managed using uplink power control (UL PC) methods. There are two uplink power control mechanisms specified by 3GPP (Third Generation Partnership Project) standards, namely open loop power control and closed-loop power control.

With open loop power control, a UE autonomously compensates for the path loss by increasing its transmit power. With closed-loop power control, the gNodeB (5G base station) controls the power up and down of a UE, using transmit power control (TPC). Such closed-loop power control algorithms are vendor-specific implementations that use 3GPP-defined TPC commands at the MAC (medium access control) layer. Any such algorithm needs to be configurable to handle different deployments that involve different types of propagation environments, user mobility requirements, density and so forth.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
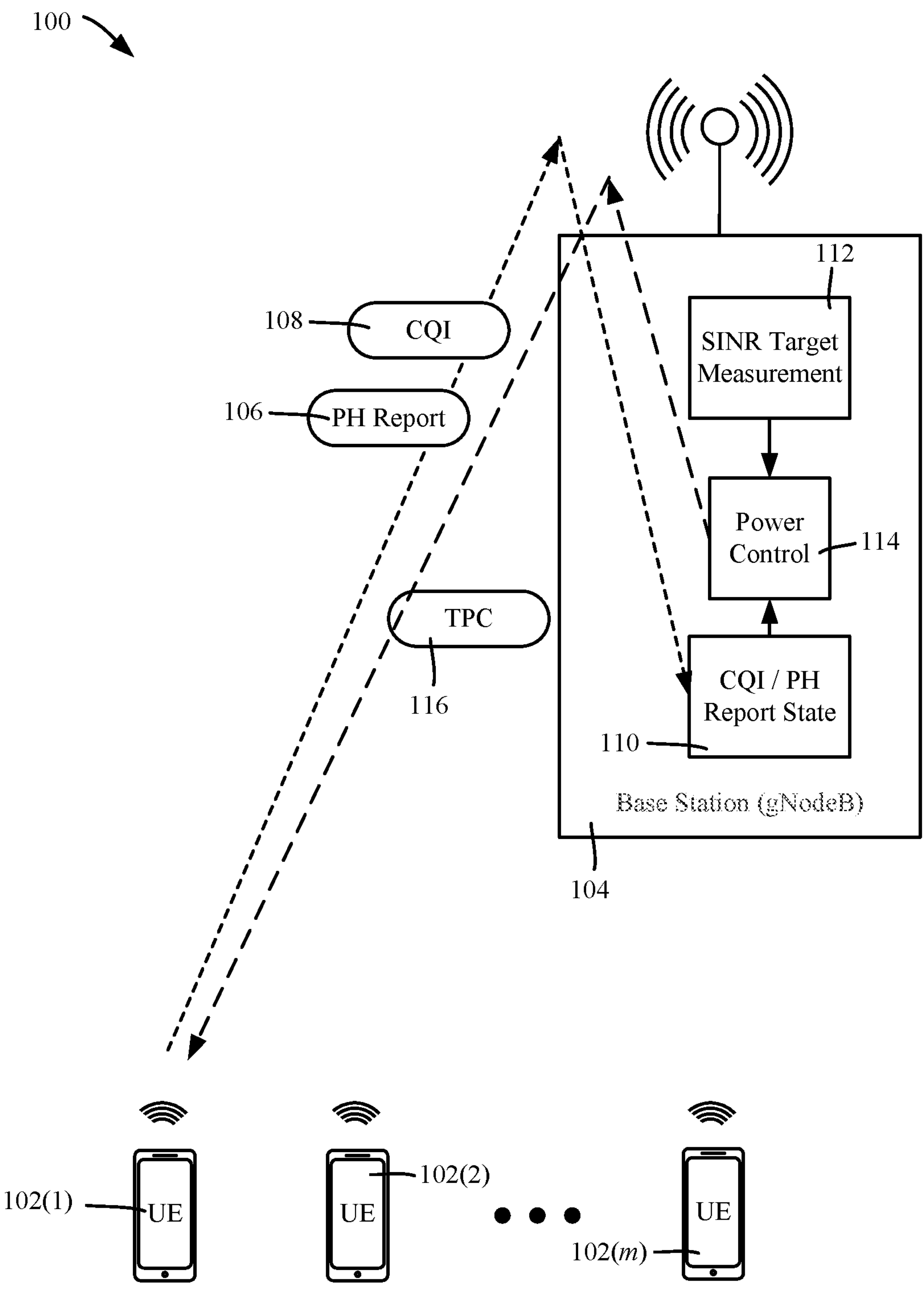
FIG. 1 is an example block diagram representation of a system/architecture for closed-loop power control based on user equipment parameters obtained at a base station, in accordance with various example embodiments and implementations of the subject disclosure.

Various example embodiments of the technology described herein are generally directed towards a power efficient, enhanced throughput, reduced inter-cell interference and low complexity technology for physical uplink shared channel (PUSCH) closed-loop power control. In one implementation, target enhancements are achieved through an artificial intelligence (AI)-based learning scheme that produce an optimized decision of the number of cell coverage zones split within a base station's overall coverage area, and for each zone, a related target signal-to-interference-plus noise ratio (SINR) value, which is used in the transmit power control calculation. More particularly, an unsupervised learning scheme referred to as deep reinforcement learning is employed in one example implementation.

As will be understood, the technology described herein significantly decreases the complexity behind determining optimal coverage zones and the optimization of target SINR values, while achieving significant UE power efficiency and higher throughput. After training, the AI system can give (virtually) immediate customized decisions related to the number of coverage zones and each zone's related target SINR, for virtually any given propagation environment. Such an extremely low latency system makes it possible to optimize the closed-loop power control, while maintaining reliable quality of service, in terms of delay, throughput and power efficiency.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. Furthermore, the particular features, structures, or characteristics may be combined in any suitable manner in one or more embodiments/implementations. It also should be noted that terms used herein, such as "optimize," "optimization," "optimal" and the like only represent objectives to move towards a more optimal state, rather than necessarily obtaining ideal results. For example, "optimal" can mean the highest performing entity of what is available, rather than necessarily achieving a fully optimal result. Similarly, "maximize" means moving towards a maximal state (e.g., up to some threshold limit, if any), rather than necessarily achieving such a state.

Example embodiments of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 is a block diagram representation of a power-efficient, enhanced-throughput, and reduced inter-cell interference system/architecture 100 for closed-loop power control over PUSCH. In FIG. 1, the UEs 102(1)-102(*m*) that are served by a base station (e.g., gNodeB) 104 report channel quality information 106 and transmit power headroom reports 108 to the base station 104; (note that in FIG. 1 only the UE 102(1) is depicted as sending the information to the base station 104 and receiving power data (TPC) therefrom, however it is understood that each UE operates similarly in this regard). Using this information (block 110) along with SINR target measurement data 112, a power control component (e.g., a system described herein with reference to FIG. 2) 114 determines transmit power control data 116 that is sent to the UE 102(1) as described herein.

The number of coverage zones and the target SINR for each coverage zone play a role in defining the overall performance of the network, including with respect to UE power efficiency, transmission throughput, inter-carrier-interference, and the like. These factors are different for each given propagation scenario and network layout. Note that typical solutions based on modeling these different characteristics to derive a configuration that controls algorithm behavior are expensive, and only provide estimates of real conditions that are never as uniform or static as modeled.

Instead, the technology described herein uses environment state information (e.g., the channel quality information and transmit power headroom reports from the UEs being served) to achieve target enhancements through an AI-based learning scheme in one example implementation. The AI-based technology produces an optimized decision of cell-coverage zones and their related SINR values, in which the optimized target SINR values are used for adjusting user equipment (UE) PUSCH transmission power via the transmission power control (TPC) calculation.

In one implementation, an unsupervised learning scheme referred to as deep reinforcement learning (DRL) is used, avoiding the need for labeled training data as in other AI/ML systems. In general, the concept of reinforcement learning refers to the learning process of an agent interacting with its environment after receiving certain observations; the environment provides a reward to the agent for every interaction, and the reinforcement learning agent aims to select the right action for the next interaction in order to maximize the discounted reward over a time horizon. By modeling the closed-loop power control problem as a Markov decision process, the DRL agent may be approximated by deep neural networks (trained by updating the network weights to produce the best decision policy). Once trained in this way, the DRL system described herein is able to produce an optimized value of coverage zones and each zone's related target SINR value such that a certain reward is maximized.

With respect to the environment, the base station (gNB) real time operations are monitored and considered as the environment of the DRL system. The following measurements are periodically captured by a gNB, and thus can be used as a state vector for the DRL system:

CQI's of the active UEs k within the gNB coverage area; (this avoids the calculation of per UE SINR values); and Per-UE power headroom; (the reported headroom is used in optimizing the target SINR values such that available power budget per UE is taken into account).

Note that the CQI of the $i^{th}$ UE is either collected at the gNB sounding reference signal (SRS) channel estimation utilizing channel reciprocity, or through channel state information reference signal (CSI-RS) signaling that estimate the CSI on the downlink. With respect to power headroom, per the 3GPP specifications the power headroom is reported to the gNB by a UE every time its transmitted power is changed.

Figure 2:
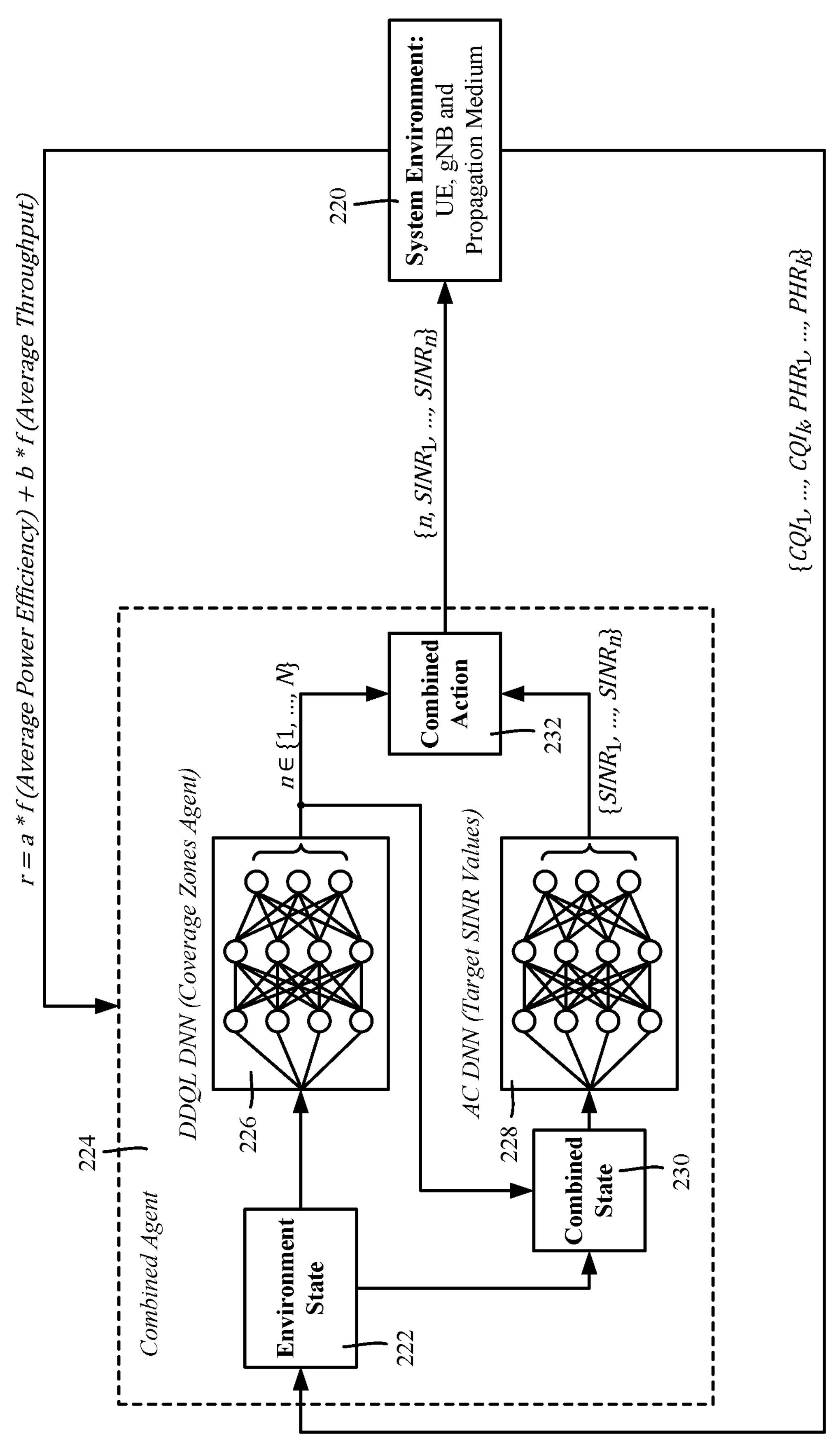
FIG. 2 shows an example block diagram representation of a deep reinforcement learning system that determines a number of coverage zones and power-related data (target signal-to-interference-plus-noise ratio (SINR) values) for each zone based on current environment state data, in accordance with various example embodiments and implementations of the subject disclosure.

In general and as represented in FIG. 2, based on the system environment 220 and its current environment state data 222 (e.g., the channel quality information and transmit power headroom reports from the UEs being served, that is, $\{CQI_1, \ldots, CQI_k, PHR_1, \ldots, PHR_k\}$ where k is the number of UEs), the technology described herein uses a DRL system to determine a predicted optimal number of coverage zones, and assign predicted optimal target SINR values for each coverage zone. As shown in the example implementation of FIG. 2, the technology described herein can be based on a combined agent 224 that combines two interacting DRL agents 226 and 228. The DRL agent 226 has previously learned its weights based on a reward function (as described herein) to predict the best number of coverage zones (denoted by n; $1 \le n \le N$, where N is the maximum number of allowed coverage zones for this base station).

With the number of coverage zones n determined, the DRL agent 228, which has also learned its own weights based on the reward function, inputs combined state data 230 including the determined number of coverage zones n along with the current environment state data 222. Based on the combined state data 230, the DRL agent 228 outputs the optimal target SINR values for each coverage zone, denoted by $\{SINR_1, \ldots, SINR_n\}$ in FIG. 2.

Figure 3:
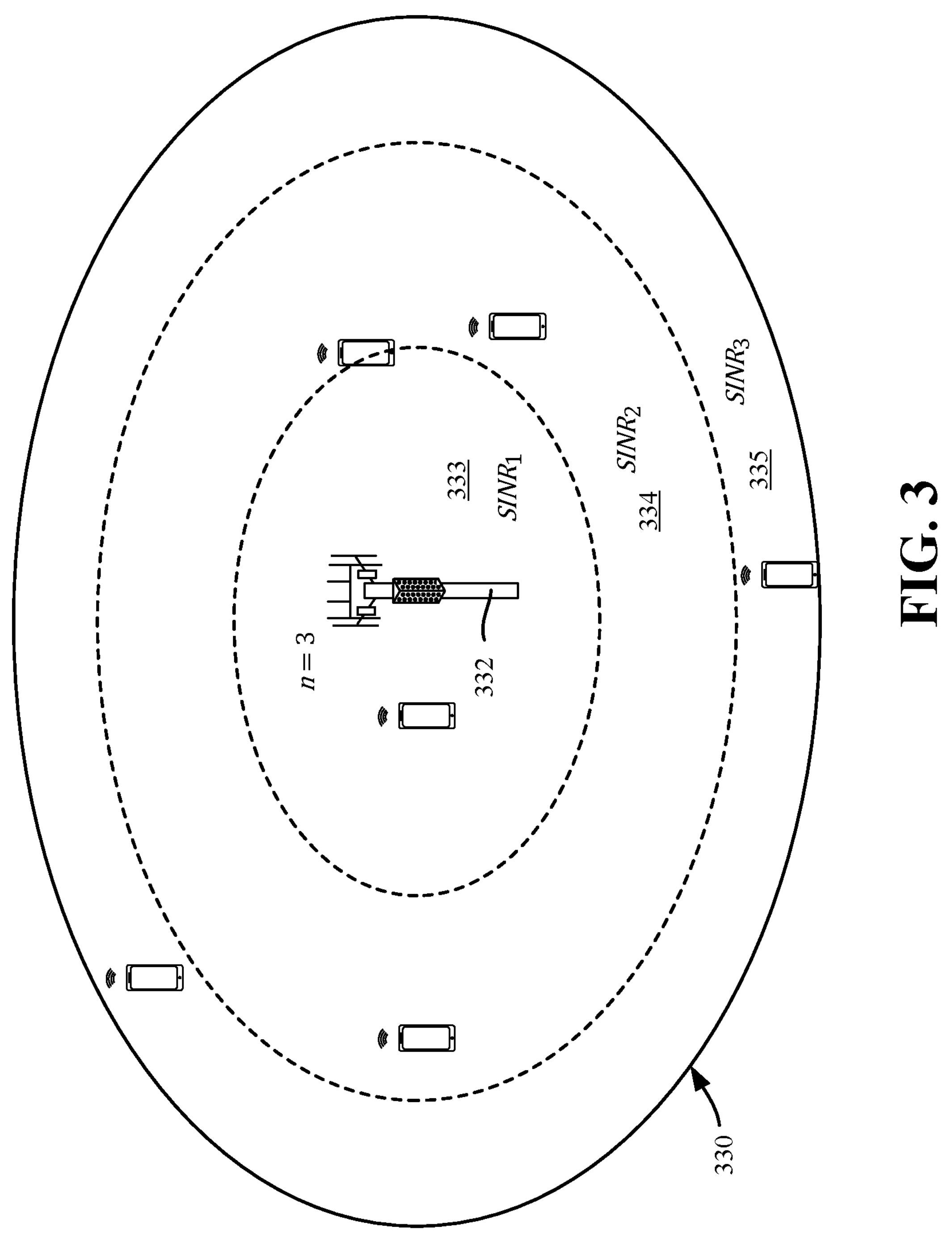
FIG. 3 shows an example representation of a base station coverage area divided into three zones based on current environment state data, in accordance with various example embodiments and implementations of the subject disclosure.
Figure 4:
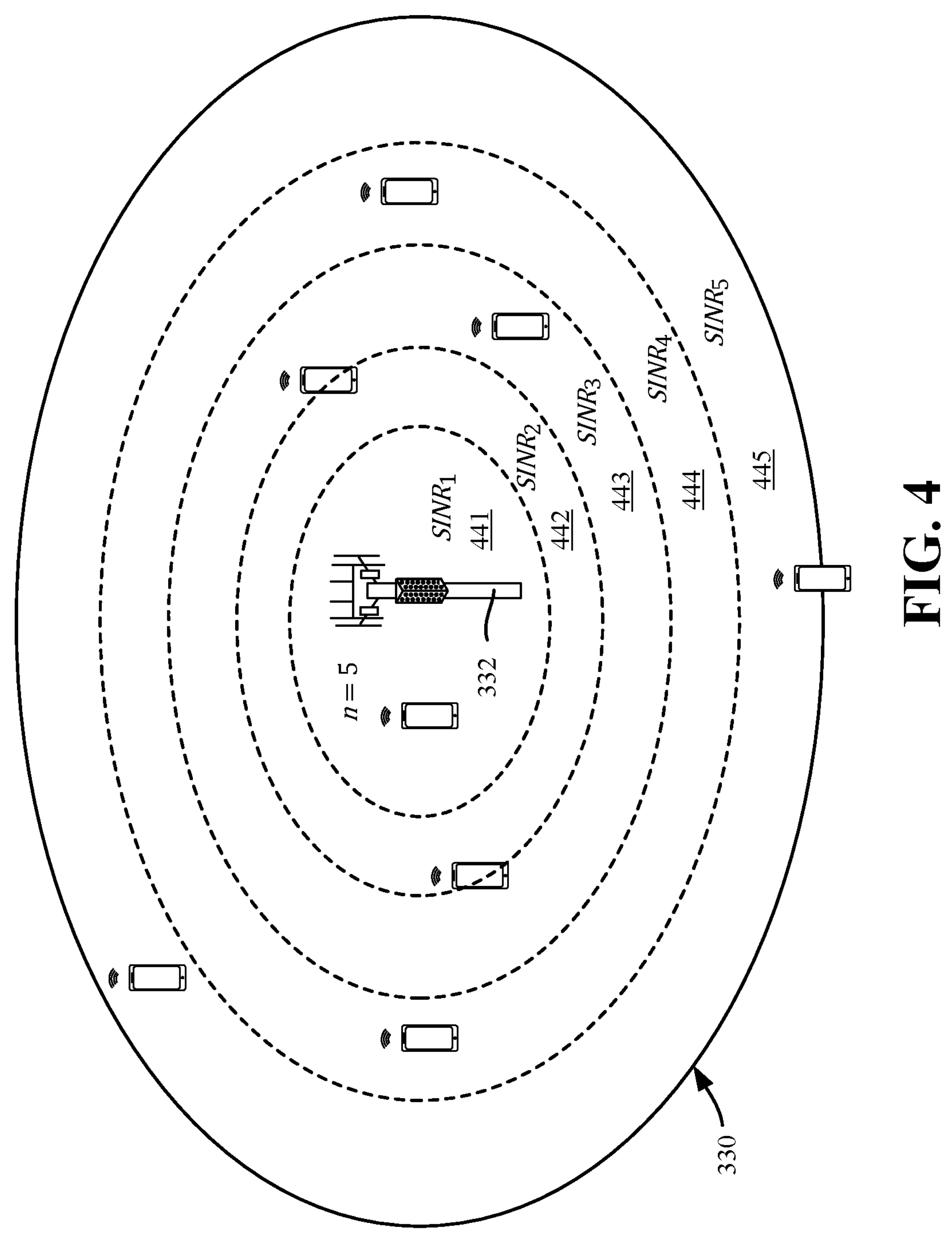
FIG. 4 shows an example representation of a base station coverage area divided into five zones based on current environment state data, in accordance with various example embodiments and implementations of the subject disclosure.

FIG. 3 shows an example representation of a coverage area 330 of a gNB 332 having been divided into three coverage zones 333-335 based on the combined agent 224 (FIG. 2) having output n=3 coverage zones with three associated SINR values $SINR_1$, $SINR_2$ and $SINR_3$. This can vary based on the total number of UEs, their distances to the gNB, the propagation media (e.g., scattering environment, buildings, geographical area, weather conditions, interference and so forth), and any other factors, in which the output of the combined agent 224 has been previously learned based on a reward function as described herein. Cell coverage zones are dynamically changing based on such factors; for example, at some later time with different conditions, for the same coverage area 330 of the gNB 332, the combined agent 224 outputs (n=5) five coverage zones 441-445, with five associated SINR values $SINR_1$-$SINR_5$, as shown in the example representation of FIG. 4. Note that the coverages zones need not be symmetrical nor of the same shape.

To summarize, returning to FIG. 2 the first DRL agent 226 gives an action of an integer number n for the number of coverage zones, which is fed back to the second DRL agent 228 to produce the target SINR values. The overall dimensionality of the combined action is then $(n+1) \times 1$. For the optimal value of n, one implementation uses a double deep-Q network (DDQN), as it shows excellent agent performance for discrete action space. For optimizing the values of target SINR values, one implementation uses an actor-critic (AC) deep neural network (DNN) agent, which produces near-optimal discrete values with an infinite space. The combined action 232 is then used to control/modify the system environment 220 by dividing the base station's coverage area into the n zones, and assigning the optimally-decided SINR value for each coverage zone for use in outputting power control data to the UEs in each coverage zone, that is, $\{n, SINR_1, \ldots, SINR_n\}$.

As is understood, the design of the reward function has a direct impact on what performance metric is given more priority over others in the system. More particularly, consider the following reward function:

$$r = a(AveragePowerEfficiency) + b(AverageThroughput),$$

where a+b=1, and 0≤a≤1, 0≤b≤1.

As is understood, more priority may be given to enhancing the power efficiency of the system by setting a>b. Conversely, to focus on better UE throughput, the system can set a<b. To give equal focus on both UEs' power efficiency and throughput, the system can set a=b=0.5.

The power efficiency of the active UEs can represent the average of power efficiency for active UEs. For example, for each UE, the power efficiency can be calculated as a moving average of the saved energy (in dBm) compared to power values when closed-loop power control is not applied. The throughput of the active UEs can represent the average throughput of the active UEs. For example, for each UE, the average throughput can be calculated as a moving average of instantaneous throughput.

Thus, the performance measurements captured from the UEs include average power efficiency, e.g., the time average efficiency of power transmitted by UEs on the uplink. This can be mathematically defined as:

$$E_{av} = \frac{1}{K}\sum_{i=1}^{K} d_i E_i,$$

where $$E_i = aE_i + bE_i^{new}, \text{ with } a + b = 1,\ 0 \le (a, b) \le 1, \text{ and } E_i^{new} = \frac{P_{new}}{P_{max}}. \quad \text{i)}$$

Here, $P_{new}$ is the new UE transmission power assigned by the gNB to the UE through control channel, and $P_{max}$ is the maximum power a certain UE can use in UL transmission;

$$d_i = \begin{cases} 0, & \text{if the } i^{th} \text{ } UE \text{ is not active} \\ 1, & \text{if the } i^{th} \text{ } UE \text{ is active} \end{cases}; \quad \text{ii)}$$

and iii) K is the maximum number of UEs supported by the gNB.

Note that these readings can be easily captured by the gNB through regular 3GPP control signaling, and there is no need for any additional signaling either on uplink or downlink communications. The average throughput is defined in a similar way to that of average efficiency. However, both uplink and downlink throughput are known by the gNB.

Figure 5:
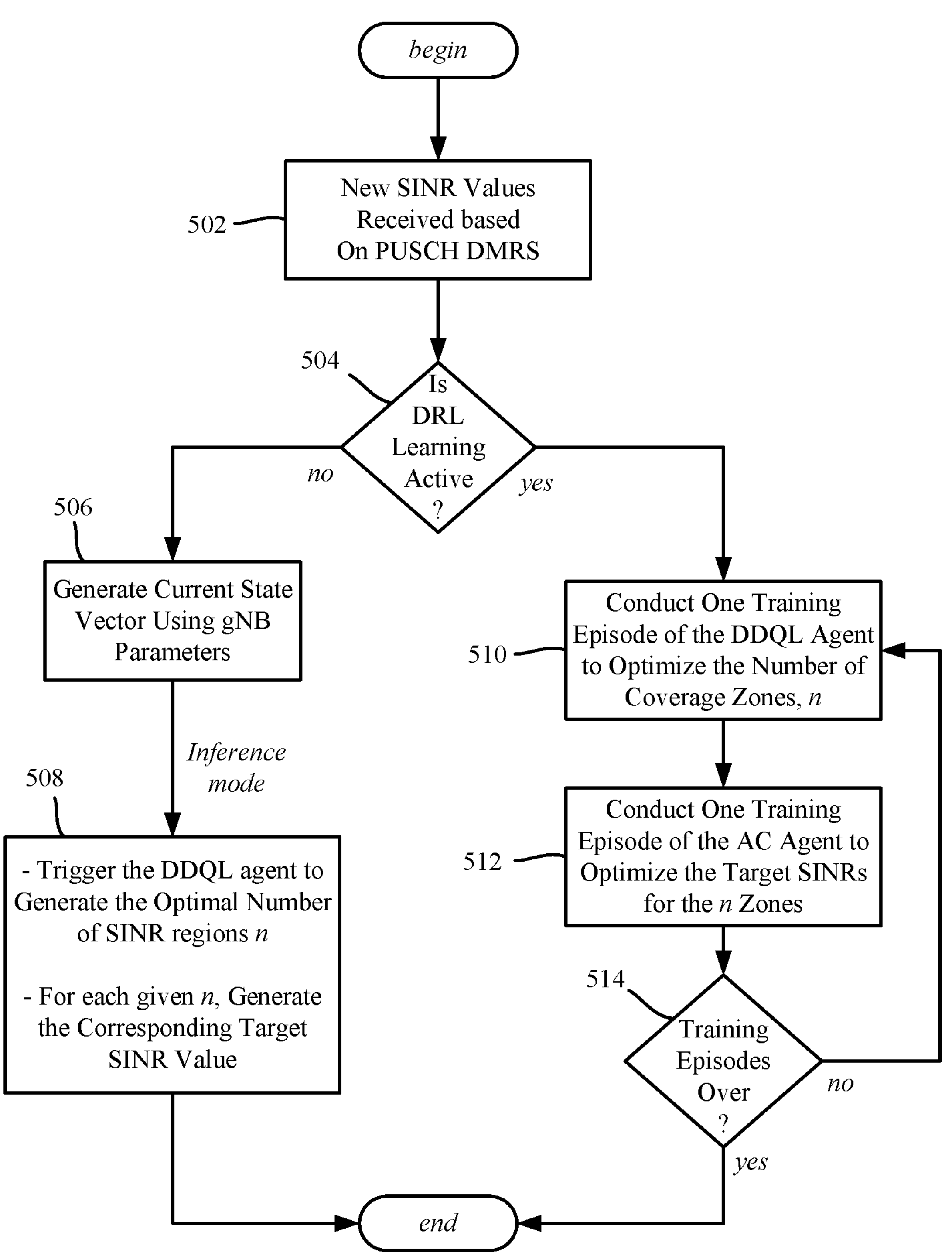
FIG. 5 a flow diagram showing example operations of a deep reinforcement learning system, including while operating in inference and learning modes, in accordance with various example embodiments and implementations of the subject disclosure.

FIG. 5 is a flow diagram showing example operations of a combined agent, where new SINR values based on PUSCH demodulation reference signals (DMRS) have been received at operation 502. This will trigger the combined agent's operations, depending on operation 504 which represents determining whether the combined agent is in inference mode (previously trained) or in learning mode.

If in inference mode, operation 506 represents generating the current state vector from the gNB parameters, e.g., $\{CQI_1, \ldots, CQI_k, PHR_1, \ldots, PHR_k\}$ where k is the number of UEs. The state vector is input into the combined agent as described herein, resulting in triggering the DDQL agent 226 (FIG. 2) to generate the optimal number of coverage zones n (corresponding to SINR regions). Then, based on the number of coverage zones n, for each given n, the AC DNN agent 228 (FIG. 2) generates the corresponding target SINR value resulting in $\{SINR_1, \ldots, SINR_n\}$ which the gNB uses to modify the current system environment by dividing into the coverage zones and applying the corresponding SINR value to each zone, $\{n, SINR_1, \ldots, SINR_n\}$. Note that there may be only one coverage zone and thus only a single SINR value decided for that zone, or there may be any number of zones, up to the (e.g., user configurable) maximum of N total zones.

Thus, while in the inference mode, the gNB provides an optimized solution for the number of SINR coverage zones as well as the values of targeted SINR value for each coverage zone. This is provided for the active UEs within the gNB coverage area during network operation. The technology described herein is able to perform this task with very low complexity, because the input-output relation of a trained DRL system represents a mere weighted sum of the DNN branches (trained weights passed by certain activation functions).

Returning to operation 504, if in learning mode, operation 510 conducts one training episode of the DDQL agent to optimize the number of coverage zones, n. Thereafter, operation 512 conducts one training episode of the AC agent to optimize the target SINRs for those n zones. Operation 514 repeats the pairs of training episodes until some stopping point. This stopping point can be some convergence level (e.g., some high percentage of a calculated maximum possible performance/power efficiency/throughput, not necessarily too high of a percentage to avoid overtraining), some number of iterations, some time limit, and/or the like.

In the learning mode, the agents of the DRL system are interacting with the surrounding network environment to optimize the accumulative reward. While doing so, the weights of the agents' deep neural networks (DNN) are updated every training episode. Once sufficiently learned, the DRL system converts into the inference mode. Note that in one implementation, in the learning mode, the system starts with some configured (default) values and then proceeds with the learning process from these initialization values. In order for the DRL system to produce an efficient optimized decision for a given networking conditions (e.g., a given propagation media, scattering scenarios, number of UEs, etc.), the DRL system described herein tracks different measurements that directly impact the accumulative reward function (such as the CQI matrices and per-UE power headroom), and/or those measurements involved directly in the calculation of the accumulative reward (such as average power efficiency and throughput).

The following table describes the environment variables and system equivalent used in learning and inference modes:

| Environment Variables | System Equivalent |
|---|---|
| State S = | $\{CQI_1, \ldots, CQI_k\}$ |

-continued

| Environment Variables | System Equivalent |
|---|---|
| $\{s_1, \ldots, s_K\}$ | |
| Reward r | $\alpha$ * f (Average Power Efficiency) + b * f (Average Throughput) |
| Action a | $\{n, SINR_1, \ldots, SINR_n\}$ |
| K | Maximum number of UEs per gNB |
| n | number of coverage zones |
| N | Maximum number of allowed coverage zones |

The learning mode is triggered at first when the technology is implemented in a base station, and then any time the system needs to be exposed to new network parameters such as including, but not limited to, the system being installed in a new propagation model (indoor, outdoor, urban, rural area, etc.), a sufficiently large new building is built in the area, new performance targets are set, (e.g., to give more weight to the average power efficiency of the system at the expense of lowered throughput restrictions), or when a new design restriction appears (e.g., to put a new restriction on the maximum number of UEs the gNB can support, or limit the number of SINR coverage zones into a smaller/larger value). It is also possible for the system to analyze the current state vector parameters with respect to deviating beyond some threshold from anything previously experienced; for example, if CQI data and/or power headroom report vectors are far unlike anything previously experienced, and/or performance (e.g., power efficiency and/or throughput) suddenly drops, it can trigger a new learning mode to learn new weights for the conditions currently being experienced that led to the perceived problems.

Note that it is feasible to train multiple models for different situations, and switch to a new model (e.g., use different learned weights) when a different situation occurs. For example, a high throughput model (b>a) can be learned and used during rush hour or other busy times, while a more power efficient model (b<a) can be learned for nighttime operation when less throughput is likely needed. Any practical number of models can be learned and chosen from as desired, as for the most part, only respective weight datasets for the agents need to be used with respect to respective different models.

Figure 6:
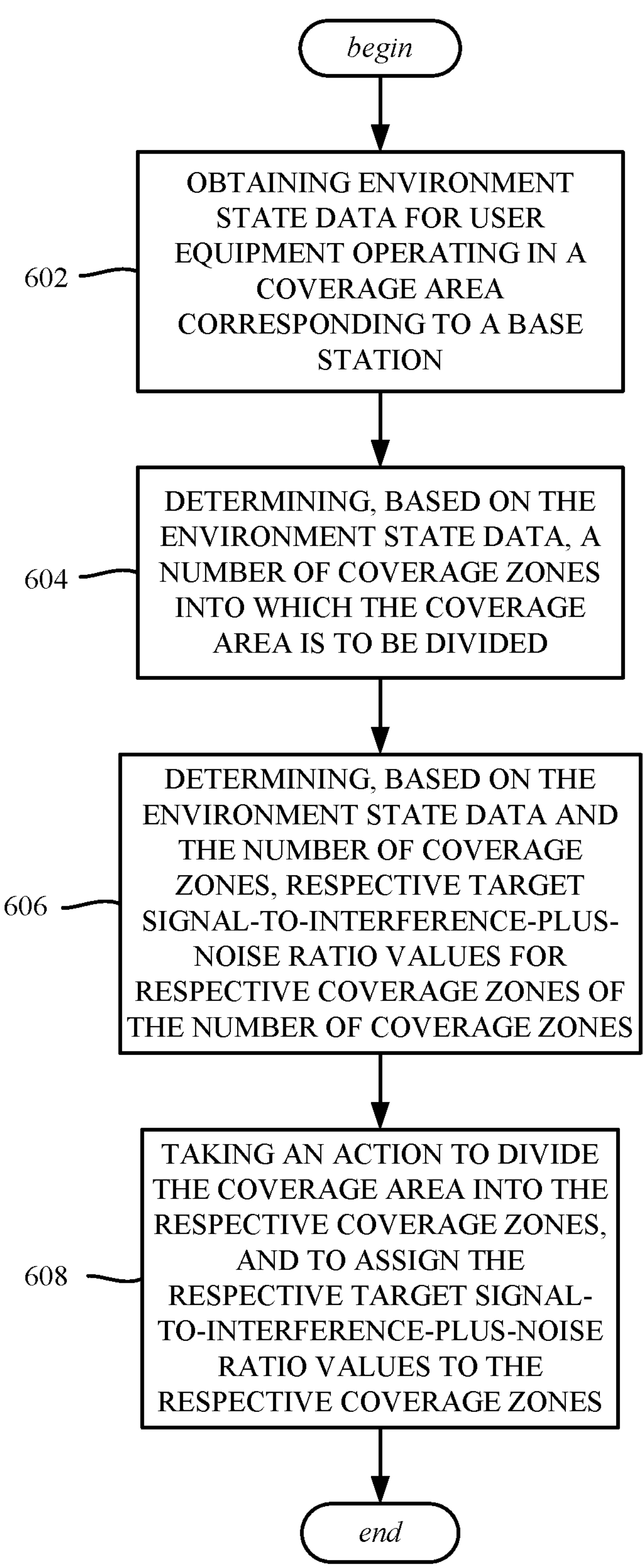
FIG. 6 is a flow diagram showing example operations related to determining a number of coverage zones and target SINR values for the coverage zones based on environment state data, in accordance with various example embodiments and implementations of the subject disclosure.

One or more example embodiments can be embodied in a system, such as represented in the example operations of FIG. 6, and for example can include a memory that stores computer executable components and/or operations, and a processor that executes computer executable components and/or operations stored in the memory. Example operations can include operation 602, which represents obtaining environment state data for user equipment operating in a coverage area corresponding to a base station. Example operation 604 represents determining, based on the environment state data, a number of coverage zones into which the coverage area is to be divided. Example operation 606 represents determining, based on the environment state data and the number of coverage zones, respective target signal-to-interference-plus-noise ratio values for respective coverage zones of the number of coverage zones. Example operation 608 represents taking an action to divide the coverage area into the respective coverage zones, and to assign the respective target signal-to-interference-plus-noise ratio values to the respective coverage zones.

Further operations can include outputting respective power data to respective subgroups of the user equipment in the respective coverage zones, based on the taking of the action to divide the base station coverage area into the respective coverage zones, and to assign the respective target signal-to-interference-plus-noise ratio values to the respective coverage zones.

The environment state data can include respective channel quality information for respective user equipment instances of the user equipment operating in the coverage area.

The environment state data can include respective power headroom report data for respective user equipment instances of the user equipment operating in the coverage area.

Determining the number of coverage zones into which the coverage area is to be divided can be performed by a double deep Q-network that learns weight data based on a reward function comprising a weighted combination of power efficiency data and throughput data. The power efficiency data can be average power efficiency, and the throughput data can be average throughput.

Determining the respective target signal-to-interference-plus-noise ratio values for the respective coverage zones can be performed by a deep neural network that learns weight data based on a reward function comprising a weighted combination of power efficiency data and throughput data. The power efficiency data can be average power efficiency, and the throughput data can be average throughput.

Determining the number of coverage zones into which the coverage area is to be divided can be performed by a double deep Q-network that learns first weight data based on a reward function comprising a weighted combination of power efficiency data and throughput data, and determining of the respective target signal-to-interference-plus-noise ratio values for the respective coverage zones can be performed by a deep neural network that learns second weight data based on the reward function. Further operations can include increasing the weight of the power efficiency data relative to the weight of the throughput data to increase power efficiency in the coverage area, or decreasing the weight of the power efficiency data relative to the weight of the throughput data to increase throughput in the coverage area.

Further operations can include determining that the environment state data corresponds to an environment state that was not previously learned, and in response, triggering an active learning mode to determine first weights for the double deep Q-network based on the environment state data and the reward function, and to determine second weights for the deep neural network based on the environment state data and the reward function.

Further operations can include detecting a convergence state corresponding to the active learning mode, and in response to the detecting of the convergence state, halting the active learning mode and entering the double deep Q-network and the deep neural network into an inference mode.

Figure 7:
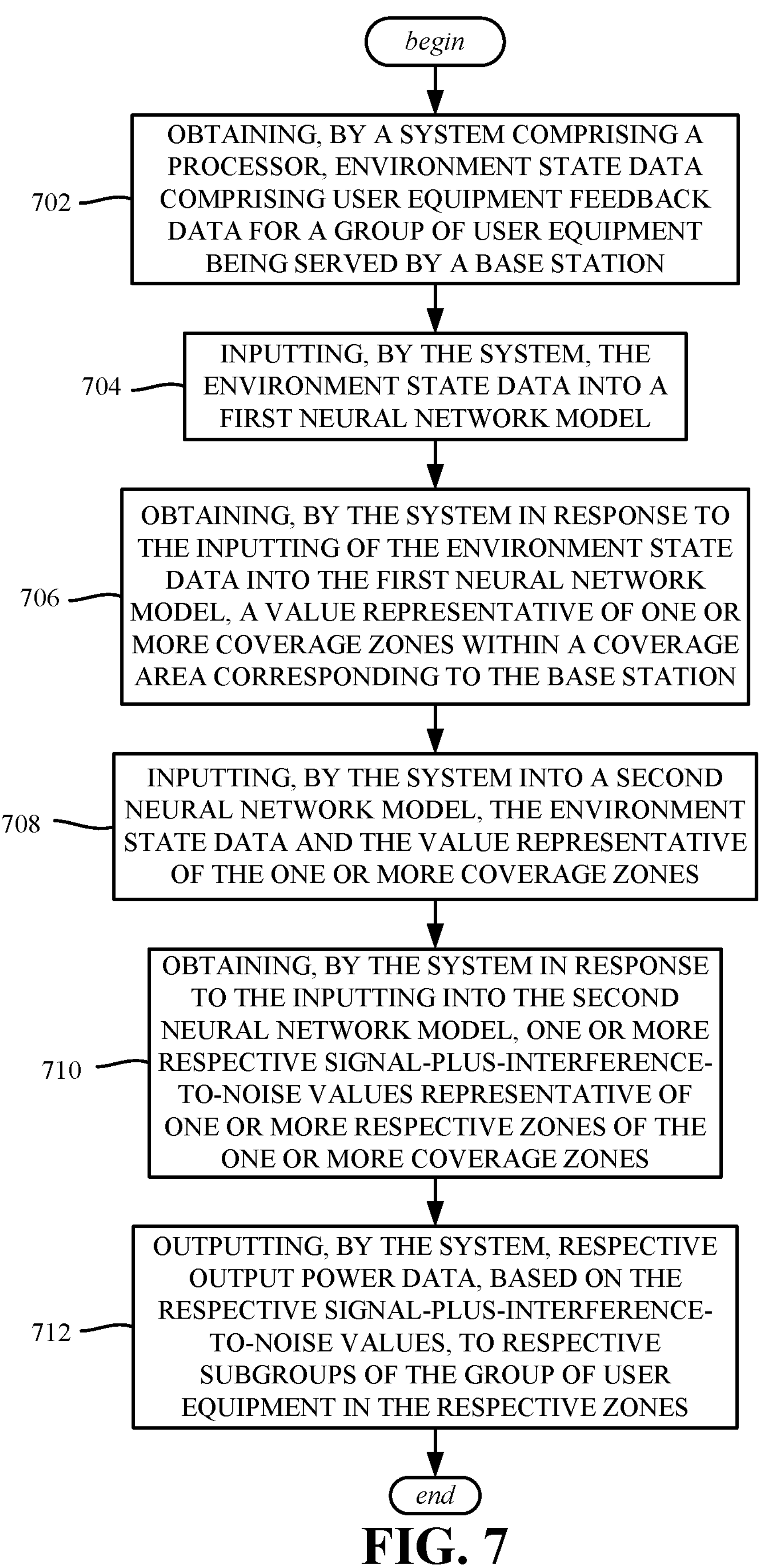
FIG. 7 is a flow diagram showing example operations related to obtaining a number of coverage zones and target SINR values for the coverage zones, for outputting power data to user equipment in the zones, in accordance with various example embodiments and implementations of the subject disclosure.

One or more example embodiments, such as corresponding to example operations of a method, are represented in FIG. 7. Example operation 702 represents obtaining, by a system comprising a processor, environment state data comprising user equipment feedback data for a group of user equipment being served by a base station. Example operation 704 represents inputting, by the system, the environment state data into a first neural network model. Example operation 706 represents obtaining, by the system in response to the inputting of the environment state data into the first neural network model, a value representative of one or more coverage zones within a coverage area corresponding to the base station. Example operation 708 represents inputting, by the system into a second neural network model, the environment state data and the value representative of the one or more coverage zones. Example operation 710 represents obtaining, by the system in response to the inputting into the second neural network model, one or more respective signal-plus-interference-to-noise values representative of one or more respective zones of the one or more coverage zones. Example operation 712 represents outputting, by the system, respective output power data, based on the respective signal-plus-interference-to-noise values, to respective subgroups of the group of user equipment in the respective zones.

Obtaining the environment state data can include obtaining user equipment feedback data comprising at least one of: respective channel quality information datasets for respective user equipment instances of the group of user equipment, or respective power headroom report data for the respective user equipment instances.

Further operations can include training, by the system, the first neural network model and the second neural network model based on a reward function comprising a weighted combination of average power efficiency data and average throughput data for the group of user equipment, to learn first weight data for the first neural network based on the reward function, and to learn second weight data for the second neural network based on the reward function.

Further operations can include increasing, by the system prior to training, the weight of the average power efficiency data relative to the weight of the average throughput data to increase power efficiency, or decreasing, by the system prior to training, the weight of the average power efficiency data relative to the weight of the average throughput data to increase throughput.

Inputting the environment state data into the first neural network model can include inputting the environment state data into a first deep reinforcement network agent comprising a double deep-Q network, and inputting the environment state data into the second neural network model can include inputting the environment state data into second reinforcement network agent comprising an actor-critic deep neural network.

Figure 8:
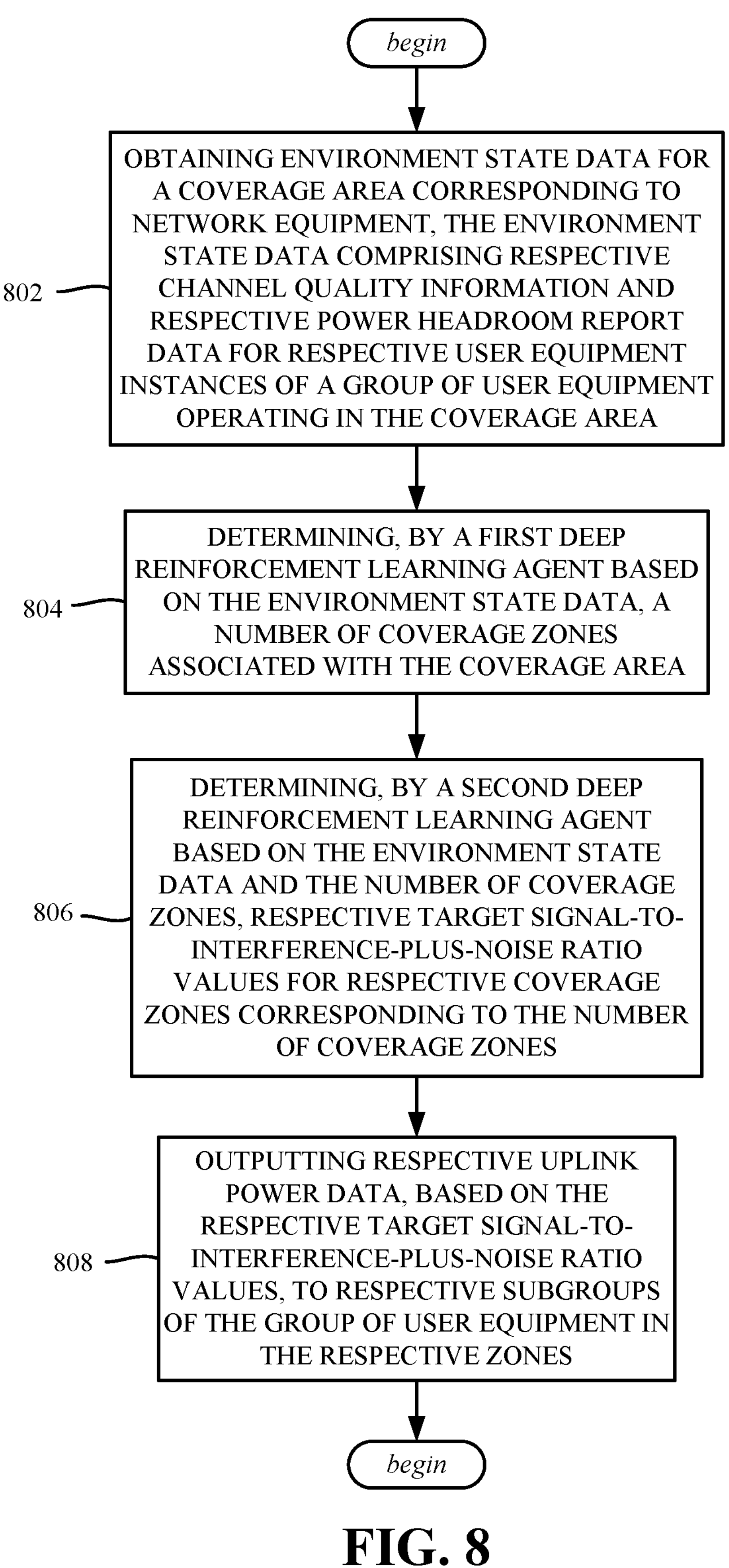
FIG. 8 is a flow diagram showing example operations related to determining a number of coverage zones and target SINR values for the coverage zones based on environment state data, and outputting uplink power data, based on the target SINR values, to subgroups of user equipment in the zones, in accordance with various example embodiments and implementations of the subject disclosure.

FIG. 8 summarizes various example operations, e.g., corresponding to a machine-readable medium, comprising executable instructions that, when executed by a processor of network equipment, facilitate performance of operations. Example operation 802 represents obtaining environment state data for a coverage area corresponding to network equipment, the environment state data comprising respective channel quality information and respective power headroom report data for respective user equipment instances of a group of user equipment operating in the coverage area. Example operation 804 represents determining, by a first deep reinforcement learning agent based on the environment state data, a number of coverage zones associated with the coverage area. Example operation 806 represents determining, by a second deep reinforcement learning agent based on the environment state data and the number of coverage zones, respective target signal-to-interference-plus-noise ratio values for respective coverage zones corresponding to the number of coverage zones. Example operation 808 represents outputting respective uplink power data, based on the respective target signal-to-interference-plus-noise ratio values, to respective subgroups of the group of user equipment in the respective zones.

Further operations can include training the first deep reinforcement learning agent and the second deep reinforcement learning agent based on a reward function comprising a weighted combination of average power efficiency data and average throughput data for the group of user equipment, to learn first weight data for the first deep reinforcement learning agent based on the reward function, and to learn second weight data for the second deep reinforcement learning agent based on the reward function.

The environment state data can be first environment state data, the number of coverage zones can be a first number of coverage zones, the respective coverage zones can be first respective coverage zones, the respective target signal-to-interference-plus-noise ratio values can be first respective target signal-to-interference-plus-noise ratio values for the first respective coverage zones, the respective uplink power data can be first respective uplink power data, and the respective subgroups can be first respective subgroups. Further operations can include obtaining second environment state data for the coverage area, determining, by the first deep reinforcement learning agent based on the second environment state data, a second number of coverage zones associated with the coverage area, determining, by a second deep reinforcement learning agent based on the second environment state data and the second number of coverage zones, second respective target signal-to-interference-plus-noise ratio values for second respective coverage zones corresponding to the second number of coverage zones, and outputting second respective uplink power data, based on the second respective target signal-to-interference-plus-noise ratio values, to second respective subgroups of the group of user equipment in the second respective zones.

As can be seen, the technology described herein facilitates and provides a significant enhancement to UE power efficiency while maintaining the same or better throughput compared to conventional PUSCH power control mechanisms. This energy-efficient scheme is in direct alignment with industry goals of achieving significantly low energy-efficient products. The technology described herein handles different deployments that involve different types of propagation environments, user mobility requirements, density and so forth.

The technology described herein facilitates a variable number of coverage zones based on CSI-based target zones that can dynamically change based on the propagation media (for example, scattering environment, buildings, geographical area, weather conditions, etc.). These coverage zones are not restricted only based on how close or far the UE is from the serving cell, but rather, how good, or bad the signal strength at a certain area is. The utilization of AI/ML methods in the online operations of PUSCH power control operations is achieved through the utilization of deep reinforcement learning (DRL) techniques that interact with the gNB-CU-CP (environment) to produce a reward that is a function of different performance metrics, and then take an optimized decision that assign the number of zones. The environment states of the DRL described herein can further be based on the number of attempts each requesting UE has made trying to connect, as well as the optimization of several important performance metrics (such as UE energy consumption, UE throughput, inter-cell interference) while assigning the appropriate coverage zones and their related respective target SINR values.

Figure 9:
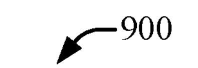
FIG. 9 is a block diagram representing an example computing environment into which example embodiments of the subject matter described herein may be incorporated.
Figure 9:
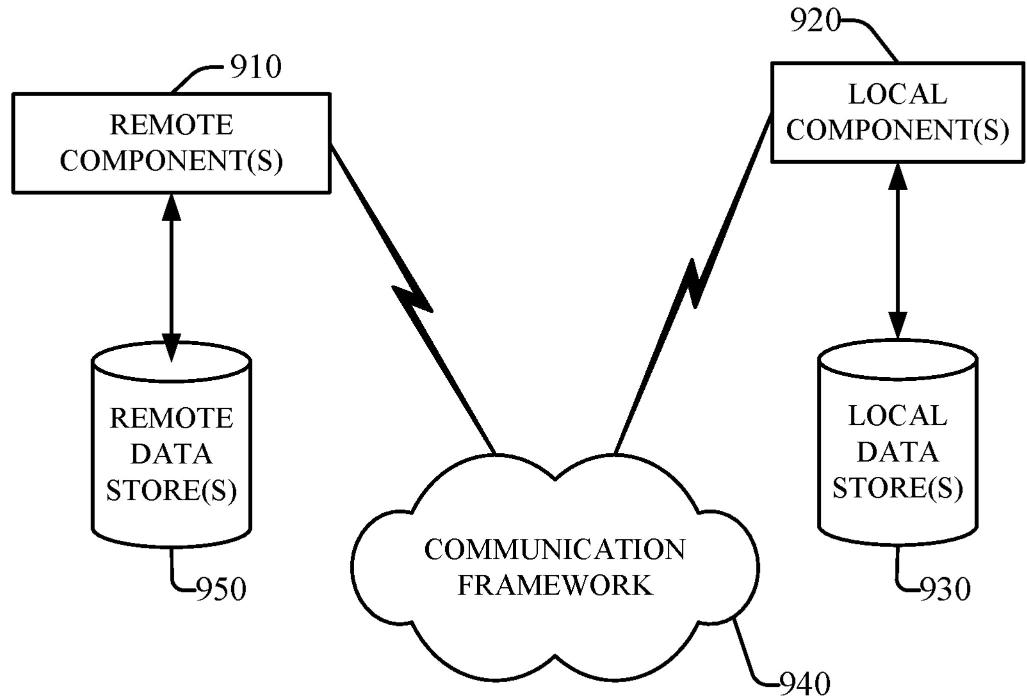

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component (s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
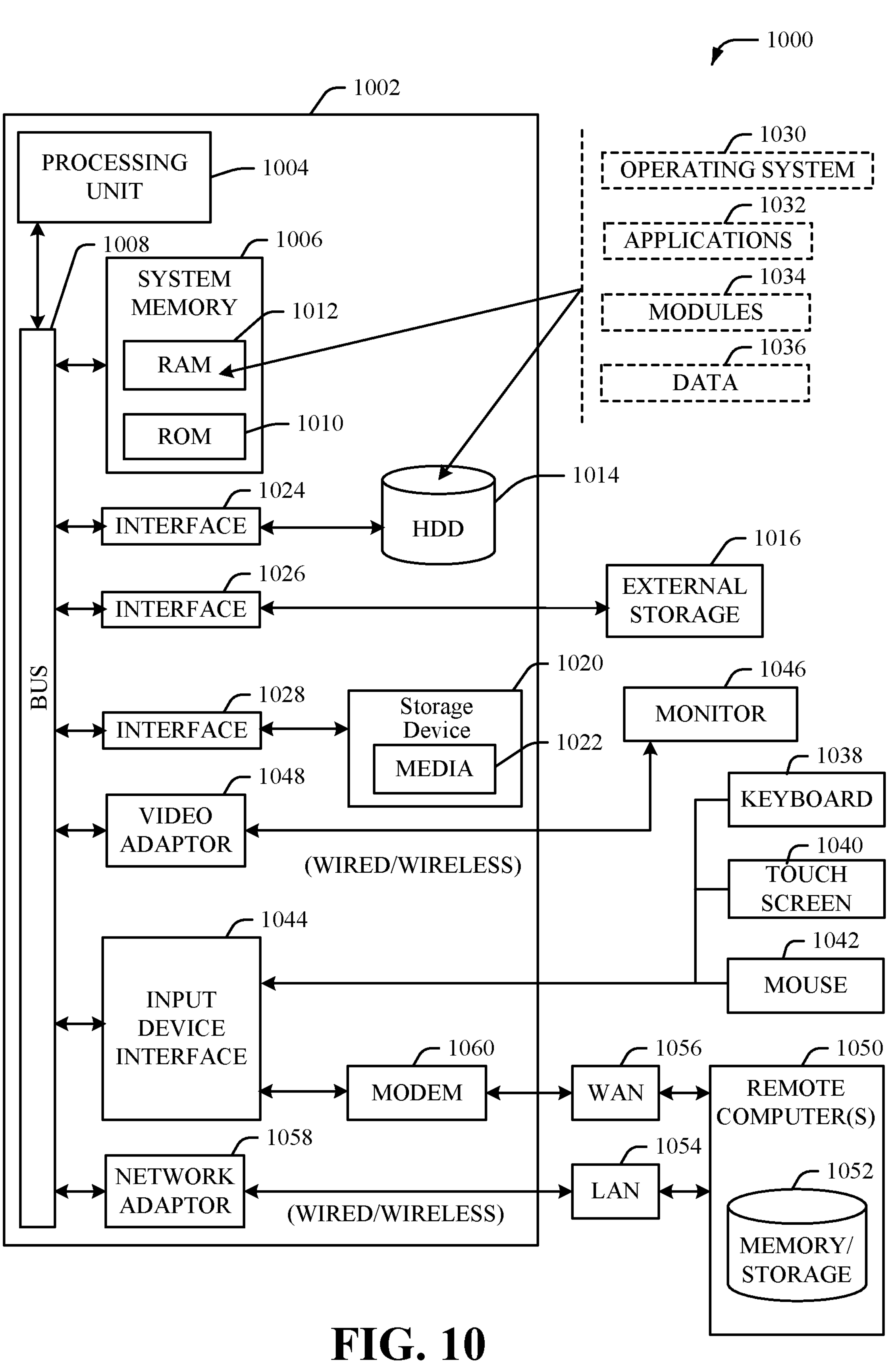
FIG. 10 depicts an example schematic block diagram of a computing environment with which the disclosed subject matter can interact/be implemented at least in part, in accordance with various example embodiments and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the example embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

a processor; and a memory that stores executable instructions that, when executed by the processor, facilitate performance of operations, the operations comprising:

obtaining environment state data for user equipment operating in a coverage area corresponding to a base station;

determining, based on the environment state data, a number of coverage zones into which the coverage area is to be divided;

determining, based on the environment state data and the number of coverage zones, respective target signal-to-interference-plus-noise ratio values for respective coverage zones of the number of coverage zones; and taking an action to divide the coverage area into the respective coverage zones, and to assign the respective target signal-to-interference-plus-noise ratio values to the respective coverage zones.

2. The system of claim 1, wherein the operations further comprise outputting respective power data to respective subgroups of the user equipment in the respective coverage zones, based on the taking of the action to divide the base station coverage area into the respective coverage zones, and to assign the respective target signal-to-interference-plus-noise ratio values to the respective coverage zones.

3. The system of claim 1, wherein the environment state data comprises respective channel quality information for respective user equipment instances of the user equipment operating in the coverage area.

4. The system of claim 1, wherein the environment state data comprises respective power headroom report data for respective user equipment instances of the user equipment operating in the coverage area.

5. The system of claim 1, wherein the determining of the number of coverage zones into which the coverage area is to be divided is performed by a double deep Q-network that learns weight data based on a reward function comprising a weighted combination of power efficiency data and throughput data.

6. The system of claim 5, wherein the power efficiency data is average power efficiency, and wherein the throughput data is average throughput.

7. The system of claim 1, wherein the determining of the respective target signal-to-interference-plus-noise ratio values for the respective coverage zones is performed by a deep neural network that learns weight data based on a reward function comprising a weighted combination of power efficiency data and throughput data.

8. The system of claim 7, wherein the power efficiency data is average power efficiency, and wherein the throughput data is average throughput.

9. The system of claim 1, wherein the determining of the number of coverage zones into which the coverage area is to be divided is performed by a double deep Q-network that learns first weight data based on a reward function comprising a weighted combination of power efficiency data and throughput data, and wherein the determining of the respective target signal-to-interference-plus-noise ratio values for the respective coverage zones is performed by a deep neural network that learns second weight data based on the reward function.

10. The system of claim 9, wherein the operations further comprise increasing the weight of the power efficiency data relative to the weight of the throughput data to increase power efficiency in the coverage area, or decreasing the weight of the power efficiency data relative to the weight of the throughput data to increase throughput in the coverage area.

11. The system of claim 9, wherein the operations further comprise determining that the environment state data corresponds to an environment state that was not previously learned, and in response, triggering an active learning mode to determine first weights for the double deep Q-network based on the environment state data and the reward function, and to determine second weights for the deep neural network based on the environment state data and the reward function.

12. The system of claim 11, wherein the operations further comprise detecting a convergence state corresponding to the active learning mode, and in response to the detecting of the convergence state, halting the active learning mode and entering the double deep Q-network and the deep neural network into an inference mode.

13. A method, comprising:

obtaining, by a system comprising a processor, environment state data comprising user equipment feedback data for a group of user equipment being served by a base station;

inputting, by the system, the environment state data into a first neural network model;

obtaining, by the system in response to the inputting of the environment state data into the first neural network model, a value representative of one or more coverage zones within a coverage area corresponding to the base station;

inputting, by the system into a second neural network model, the environment state data and the value representative of the one or more coverage zones;

obtaining, by the system in response to the inputting into the second neural network model, one or more respective signal-plus-interference-to-noise values representative of one or more respective zones of the one or more coverage zones; and outputting, by the system, respective output power data, based on the respective signal-plus-interference-to-noise values, to respective subgroups of the group of user equipment in the respective zones.

14. The method of claim 13, wherein the obtaining of the environment state data comprises obtaining user equipment feedback data comprising at least one of: respective channel quality information datasets for respective user equipment instances of the group of user equipment, or respective power headroom report data for the respective user equipment instances.

15. The method of claim 13, further comprising training, by the system, the first neural network model and the second neural network model based on a reward function comprising a weighted combination of average power efficiency data and average throughput data for the group of user equipment, to learn first weight data for the first neural network based on the reward function, and to learn second weight data for the second neural network based on the reward function.

16. The method of claim 15, further comprising increasing, by the system prior to training, the weight of the average power efficiency data relative to the weight of the average throughput data to increase power efficiency, or decreasing, by the system prior to training, the weight of the average power efficiency data relative to the weight of the average throughput data to increase throughput.

17. The method of claim 13, wherein the inputting of the environment state data into the first neural network model comprises inputting the environment state data into a first deep reinforcement network agent comprising a double deep-Q network, and wherein the inputting of the environment state data into the second neural network model comprises inputting the environment state data into second reinforcement network agent comprising an actor-critic deep neural network.

18. A non-transitory machine-readable medium, comprising executable instructions that, when executed by a processor of network equipment, facilitate performance of operations, the operations comprising:

obtaining environment state data for a coverage area corresponding to network equipment, the environment state data comprising respective channel quality information and respective power headroom report data for respective user equipment instances of a group of user equipment operating in the coverage area;

determining, by a first deep reinforcement learning agent based on the environment state data, a number of coverage zones associated with the coverage area;

determining, by a second deep reinforcement learning agent based on the environment state data and the number of coverage zones, respective target signal-to-interference-plus-noise ratio values for respective coverage zones corresponding to the number of coverage zones;

outputting respective uplink power data, based on the respective target signal-to-interference-plus-noise ratio values, to respective subgroups of the group of user equipment in the respective zones.

19. The non-transitory machine-readable medium of claim 18, wherein the operations further comprise training the first deep reinforcement learning agent and the second deep reinforcement learning agent based on a reward function comprising a weighted combination of average power efficiency data and average throughput data for the group of user equipment, to learn first weight data for the first deep reinforcement learning agent based on the reward function, and to learn second weight data for the second deep reinforcement learning agent based on the reward function.

20. The non-transitory machine-readable medium of claim 18, wherein the environment state data is first environment state data, wherein the number of coverage zones is a first number of coverage zones, wherein the respective coverage zones are first respective coverage zones, wherein the respective target signal-to-interference-plus-noise ratio values are first respective target signal-to-interference-plus-noise ratio values for the first respective coverage zones, wherein the respective uplink power data is first respective uplink power data, wherein the respective subgroups are first respective subgroups, and wherein the operations further comprise:

obtaining second environment state data for the coverage area;

determining, by the first deep reinforcement learning agent based on the second environment state data, a second number of coverage zones associated with the coverage area;

determining, by a second deep reinforcement learning agent based on the second environment state data and the second number of coverage zones, second respective target signal-to-interference-plus-noise ratio values for second respective coverage zones corresponding to the second number of coverage zones; and outputting second respective uplink power data, based on the second respective target signal-to-interference-plus-noise ratio values, to second respective subgroups of the group of user equipment in the second respective zones.

* * * * *